US012650181B2

(12) United States Patent
Parthasarathy

(10) Patent No.: US 12,650,181 B2
(45) Date of Patent: Jun. 9, 2026

(54) PRESSURE RELIEF VALVE WITH REDUNDANT PRESSURE SENSING

(71) Applicant: SRI ENERGY, INC., Sugar Land, TX (US)

(72) Inventor: Anand Parthasarathy, Cypress, TX (US)

(73) Assignee: SRI ENERGY, INC., Sugar Land, TX (US)

( * ) Notice: Subject to any disclaimer, the term of this patent is extended or adjusted under 35 U.S.C. 154(b) by 0 days.

(21) Appl. No.: 19/046,557

(22) Filed: Feb. 6, 2025

(65) Prior Publication Data

US 2025/0257815 A1      Aug. 14, 2025

Related U.S. Application Data

(60) Provisional application No. 63/551,478, filed on Feb. 8, 2024.

(51) Int. Cl.
F16K 37/00          (2006.01)
F16K 17/00          (2006.01)

(52) U.S. Cl.
CPC .......... F16K 37/0091 (2013.01); F16K 17/00 (2013.01)

(58) Field of Classification Search
CPC ................. F16K 37/0091; F16K 17/00; Y10T 137/0379; Y10T 137/776
USPC ....................................................... 700/282
See application file for complete search history.

(56) References Cited

U.S. PATENT DOCUMENTS

| | | | | |
|---|---|---|---|---|
| 5,190,068 A * | 3/1993 | Philbin | .................... | G05D 7/06 |
| | | | | 137/487 |
| 10,215,321 B2 * | 2/2019 | Critsinelis | ............... | F16L 57/00 |
| 10,753,852 B2 * | 8/2020 | Mujica | ................... | G01N 17/00 |
| 11,773,992 B2 * | 10/2023 | Bouchard | ............... | E03C 1/106 |
| | | | | 137/527.4 |
| 12,180,690 B1 * | 12/2024 | Chandler | ............ | G01L 19/0007 |
| 2002/0043282 A1 * | 4/2002 | Horne | ..................... | E03B 7/077 |
| | | | | 137/218 |
| 2006/0076062 A1 * | 4/2006 | Andersson | ............ | F16K 15/063 |
| | | | | 137/512 |
| 2006/0111875 A1 * | 5/2006 | Breen | ................. | F16K 37/0091 |
| | | | | 702/188 |

(Continued)

OTHER PUBLICATIONS

Definition of "contiguous" from https://www.merriam-webster.com/dictionary/contiguous (retrieved Aug. 12, 2025) (Year: 2025).*

(Continued)

*Primary Examiner* — Jessica Cahill
(74) *Attorney, Agent, or Firm* — Trop, Pruner & Hu, P.C.

(57)          ABSTRACT

An embodiment includes an oilfield manifold system that uses multiple pressure transmitters with a single pressure relief valve. The embodiment further incorporates related logic that may enable voting among transmitter pressure readings from multiple transmitters during, for example, the above-mentioned failure circumstances. As a result, the pressure relief valve is ensured it functions as needed without opening or closing falsely when the actual pressure within valve does not meet the valve open set criteria. In an embodiment, the logic dictates how the valve should function in various situations (e.g., when all pressure transmitter systems generate faulty readings) to ensure safe system/process functionality.

15 Claims, 8 Drawing Sheets

(56)     References Cited

U.S. PATENT DOCUMENTS

| | | | | |
|---|---|---|---|---|
| 2007/0204917 | A1* | 9/2007 | Clayton .............. | F16K 27/0209 |
| | | | | 137/512 |
| 2010/0305883 | A1* | 12/2010 | Danzy .................... | G01F 25/10 |
| | | | | 702/50 |
| 2012/0227983 | A1* | 9/2012 | Lymberopoulos ...... | E21B 34/10 |
| | | | | 166/373 |
| 2014/0261778 | A1* | 9/2014 | Hamilton ................ | F16K 17/00 |
| | | | | 137/461 |
| 2018/0112796 | A1* | 4/2018 | Junk .................... | F15B 19/005 |
| 2018/0216443 | A1 | 8/2018 | Williams et al. | |
| 2020/0190939 | A1 | 6/2020 | Gray et al. | |
| 2020/0284122 | A1 | 9/2020 | Golden et al. | |
| 2020/0408086 | A1 | 12/2020 | Jagannathan | |
| 2022/0282615 | A1 | 9/2022 | Alghazali et al. | |
| 2022/0333360 | A1* | 10/2022 | Burke .................... | E03B 7/075 |

OTHER PUBLICATIONS

"What are the 5 sources of measurement errors with a pressure transmitter?", Fuji Electric, downloaded from https://www.fujielectric.fr/en/news/what-are-5-sources-measurement-errors-with-pressure-transmitter on Feb. 9, 2024 (2 pages).

"Question & Answer", Vendatu.com, downloaded from https://www.vedantu.com/question-answer/find-the-midvalue-of-class-interval-3040-class-10-statistics-cbse-5f8fc955d6782a6e7c182ca8 on Feb. 9, 2024 (3 pages).

International Searching Authority, International Search Report and Written Opinion dated May 23, 2025 in International Application No. PCT/US2025/014693 (11 pages).

* cited by examiner

LOGIC 1

| WHEN 2 PT READINGS ARE GOOD | GOOD READING PT1 (mA) | GOOD READING PT2 (mA) | (FAULTY READING) PT3 (mA) |
|---|---|---|---|
| | 5.05 | 5.08 | 8 |

| | LOGIC | ERROR DIFFERENCE |
|---|---|---|
| STEP 1 | PT1 - PT2 | 0.03 |
| STEP 2 | PT2 - PT3 | 2.92 |
| STEP 3 | PT3 - PT1 | 2.95 |
| STEP 4 | MIN (ALL THREE PT DIFFERENCE) | 0.03 |
| STEP 5 | FINAL VALUE CHOSEN: BASED ON MIN, USE MIN (CORRESPONDING PT, PT) (OR) | BASED ON MIN, USE AVERAGE (CORRESPONDING PT, PT) |

NOTE: ERROR DIFFERENCE TO BE WITHIN USER SET THRESHOLD INCASE ALL THREE TRANSMITTER READING ARE OFF VERSUS ACTUAL (OR) TRANSMITTER SEVERELY OUT OF CALIBRATION

| IF ALL THREE READINGS ARE OFF, THEN | PT1 (mA) | PT2 (mA) | PT3 (mA) |
|---|---|---|---|
| | 5.05 | 10 | 15 |

| | LOGIC | ERROR DIFFERENCE |
|---|---|---|
| STEP 1 | PT1 - PT2 | 4.95 |
| STEP 2 | PT2 - PT3 | 5 |
| STEP 3 | PT3 - PT1 | 9.95 |
| STEP 4 | MIN (ALL THREE PT DIFFERENCE) | 4.95 |
| STEP 5 | FINAL VALUE CHOSEN: BASED ON MIN, USE MIN (CORRESPONDING PT, PT) (OR) | BASED ON MIN, USE AVERAGE (CORRESPONDING PT, PT) |

NOTE: ERROR DIFFERENCE TO BE WITHIN USER SET THRESHOLD INCASE ALL THREE TRANSMITTER READING ARE OFF VERSUS ACTUAL (OR) TRANSMITTER SEVERELY OUT OF CALIBRATION

IF USER SET THRESHOLD: EXAMPLE <0.2
THEN FINAL VALUE CANNOT BE CHOSEN SINCE NOT ABLE TO IDENTIFY WHICH ONE OF THE TRASMITTER READING IS FAULT, PRV SYSTEM GOES TO FAIL SAFE STATE.

LOGIC#2

LOGIC #2

| | GOOD READING PT1 (mA) | GOOD READING PT2 (mA) | (FAULTY READING) PT3 (mA) |
|---|---|---|---|
| WHEN 2 PT READINGS ARE GOOD | 5.05 | 5.08 | 8 |

| | | |
|---|---|---|
| RANGE OF TRANSMITTER | 4mA - 20mA | 16mA |

| | | ERROR % |
|---|---|---|
| STEP 1 | MID VALUE (PT1,PT2,PT3) | 5.08 |
| STEP 2 | ABS ((PT1 - MID VALUE)/RANGE OF TRANSMITTER) | 0.19% |
| STEP 3 | ABS ((PT2 - MID VALUE)/RANGE OF TRANSMITTER) | 0% |
| STEP 4 | ABS ((PT3 - MID VALUE)/RANGE OF TRANSMITTER) | 18% |

USER SET ERROR THRESHOLD = 1%
NOTE: ERROR DIFFERENCE TO BE WITHIN USER SET THRESHOLD INCASE ALL THREE TRANSMITTER READING ARE OFF VERSUS ACTUAL (OR) TRANSMITTER SEVERELY OUT OF CALIBRATION

| STEP 5 | BASED ON ERROR THRESHOLD SET, NEXT TO IDENTIFY STEP2, STEP3 AND/OR STEP 4 QUALIFIES. | (IN ABOVE CASE, BASED ON 0.19% AND 0% LESS THAN THRESHOLD, PT1 & PT2 PART OF THAT STEP IS IDENTIFIED. |
|---|---|---|
| | QUALIFIED PTS ARE SELECTED FROM STEP 5 | |
| STEP 6 | FINAL VALUE CHOSEN: AVG (QUALIFIED PTS) | AVERAGE (5.05 & 5.08) = 5.065 mA |

| | PT1 (mA) | PT2 (mA) | PT3 (mA) |
|---|---|---|---|
| IF ALL THREE READINGS ARE OFF, THEN | 5.05 | 10 | 15 |

| | | ERROR DIFFERENCE |
|---|---|---|
| STEP 1 | MID VALUE (PT1, PT2, PT3) | 5.08 |
| STEP 2 | ABS ((PT1 - MID VALUE)/RANGE OF TRANSMITTER) | 30.94% |
| STEP 3 | ABS ((PT2 - MID VALUE)/RANGE OF TRANSMITTER) | 0 |
| STEP 4 | ABS ((PT3 - MID VALUE)/RANGE OF TRANSMITTER) | 31% |

USER SET ERROR THRESHOLD = 1%
NOTE: ERROR DIFFERENCE TO BE WITHIN USER SET THRESHOLD INCASE ALL THREE TRANSMITTER READING ARE OFF VERSUS ACTUAL (OR) TRANSMITTER SEVERELY OUT OF CALIBRATION

| STEP 5 | BASED ON ERROR THRESHOLD SET, NEXT TO IDENTIFY STEP2, STEP3 AND/OR STEP 4 QUALIFIES. | (IN ABOVE CASE, NO TRANSMITTER IS IDENTIFIED MEETING THRESHOLD CRITERIA) |
|---|---|---|
| | QUALIFIED PTS ARE SELECTED FROM STEP 5 | |
| STEP 6 | FINAL VALUE CHOSEN: AVG (QUALIFIED PTS) | |

IF USER SET THRESHOLD, EXAMPLE <1%
THEN FINAL VALUE CANNOT BE CHOSEN SINCE NOT ABLE TO IDENTIFY WHICH ONE OF THE TRANSMITTER READING IS FAULT, PRV SYSTEM GOES TO FAIL SAFE STATE.

Figure 3B:
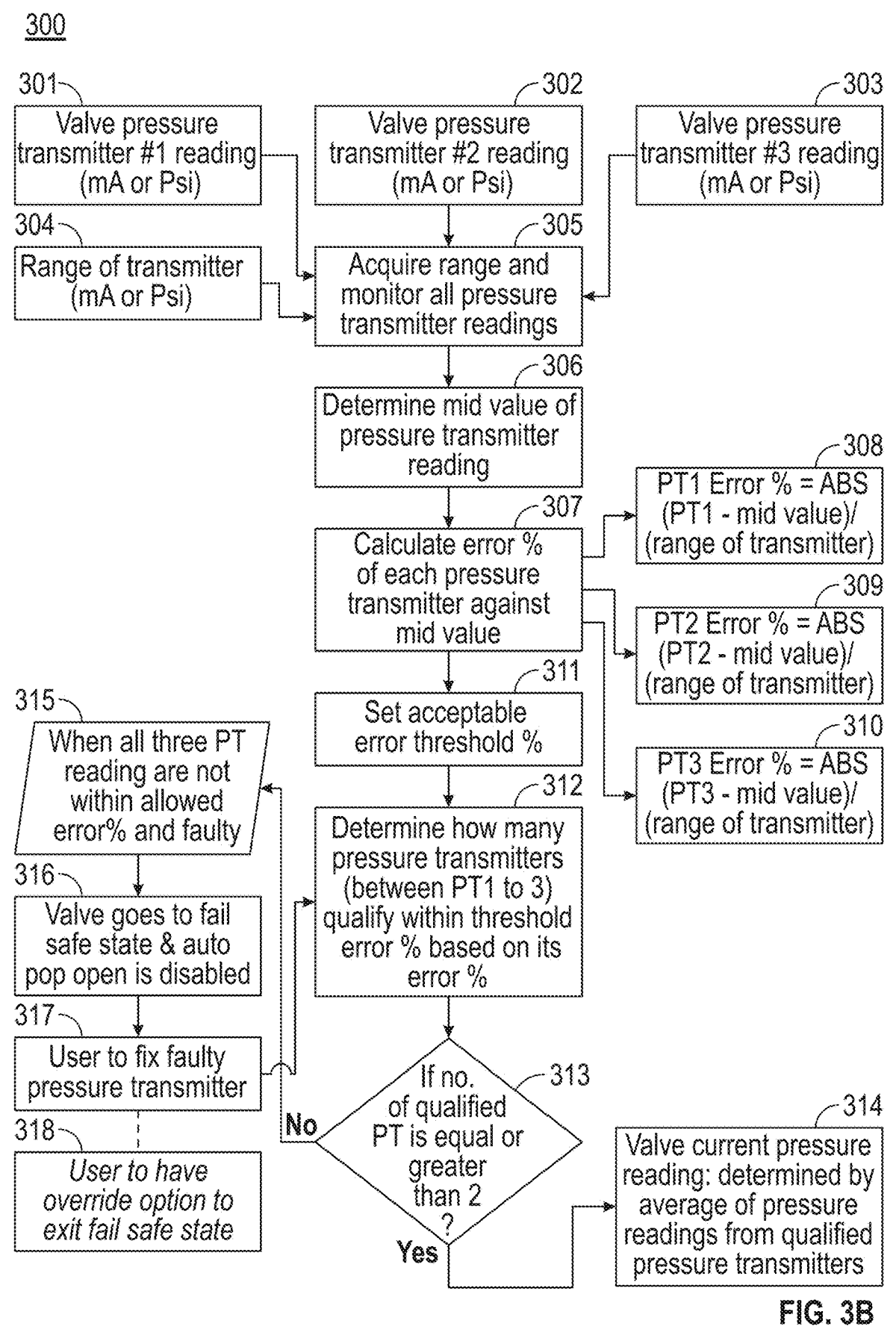

301 — Valve pressure transmitter #1 reading (mA or Psi)

302 — Valve pressure transmitter #2 reading (mA or Psi)

303 — Valve pressure transmitter #3 reading (mA or Psi)

304 — Range of transmitter (mA or Psi)

305 — Acquire range and monitor all pressure transmitter readings

306 — Determine mid value of pressure transmitter reading

307 — Calculate error % of each pressure transmitter against mid value

308 — PT1 Error % = ABS (PT1 - mid value)/ (range of transmitter)

309 — PT2 Error % = ABS (PT2 - mid value)/ (range of transmitter)

310 — PT3 Error % = ABS (PT3 - mid value)/ (range of transmitter)

311 — Set acceptable error threshold %

312 — Determine how many pressure transmitters (between PT1 to 3) qualify within threshold error % based on its error %

315 — When all three PT reading are not within allowed error% and faulty

316 — Valve goes to fail safe state & auto pop open is disabled

317 — User to fix faulty pressure transmitter

318 — User to have override option to exit fail safe state

313 — If no. of qualified PT is equal or greater than 2 ?

No

Yes

314 — Valve current pressure reading: determined by average of pressure readings from qualified pressure transmitters

PRESSURE RELIEF VALVE WITH REDUNDANT PRESSURE SENSING

CROSS-REFERENCE TO RELATED APPLICATION

This application claims priority to U.S. Provisional Patent Application No. 63/551,478 filed on Feb. 8, 2024 and entitled "Pressure Relief Valve with Redundant Pressure Sensing", the content of which is hereby incorporated by reference.

BACKGROUND

In the oil and gas sector, a pressure relief valve is often a quick-acting, spring-loaded valve that opens to relieve pressure when the pressure exceeds the spring setting. Such a valve is often installed on the body cavity of ball and gate valves to relieve thermal overpressure in liquid services (e.g., increase in pressure due to thermal expansion of liquid in the valve). More generally, pressure relief valve systems may sense pressure within the valve (or in an area coupled to the valve) and then actuate the valve if the sensed pressure exceeds a threshold. A "pressure transmitter" (as used herein) is sometimes called a pressure transducer or sensor. The pressure transmitter is a device or system capable of measuring applied pressure, such as the pressure in a pressure relief valve, and then converting the physical pressure into an electrical signal.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIGS. 2A and 2B show embodiments of logic for operating with the system of FIGS. 1A and 1B.

FIGS. 3A and 3B show embodiments of logic for operating with the system of FIGS. 1A and 1B.

DETAILED DESCRIPTION

Figures 1A, 1B:
FIGS. 1A and 1B illustrate different perspective views of an embodiment of a pressure relief valve (PRV) with multiple pressure transmitters.

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments (e.g., walls may not be exactly orthogonal to one another in actual fabricated devices). Moreover, the drawings may only show the structures useful to understand the illustrated embodiments. Additional structures known in the art may not have been included to maintain the clarity of the drawings. For example, not every layer of a device is necessarily shown. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Phrases such as "comprising at least one of A or B" include situations with A, B, or A and B.

Applicant determined conventional pressure relief valves used in the oil and gas sector may incorporate a single pressure transmitter. With such a system, the valve opens automatically when: (1) the transmitter reading (i.e., valve pressure) matches an automatic open pressure set point (set by the valve user to prevent a high-pressure event), and (2) the transmitter causes the valve (directly or indirectly) to open and relieve pressure. However, due to environmental conditions and/or hardware failures (e.g., transmitter hardware failure or cabling/wireless communication path failure), the sensing may be inaccurate and provide, for example, a false high pressure reading, a false low pressure reading, no reading at all, etc. In these cases, the valve may open when it should remain closed (e.g., at a false high pressure reading) or stay closed without opening (e.g., since no reading is seen, the pressure does not match a predetermined automatic open set point).

However, an embodiment uses multiple pressure transmitters with a single pressure relief valve. The embodiment further incorporates related logic that may enable voting among transmitter pressure readings from multiple transmitters during, for example, the above-mentioned failure circumstances. As a result, the pressure relief valve is ensured it functions as needed without opening or closing falsely when the actual pressure within valve does not meet the valve open set criteria. In an embodiment, the logic dictates how the valve should function in various situations (e.g., when all pressure transmitter systems generate faulty readings) to ensure safe system/process functionality. An embodiment uses X pressure transmitters and X-1 transmitter voting logic as will be explained further below. This decreases the probability of failure due to erroneous transmitter reading dramatically.

More generally, embodiments incorporate multiple pressure transmitters coupled to a pressure relief valve to reduce the probability of failure of an automatic open valve during high pressures event due to a malfunctioning transmitter.

An embodiment incorporates transmitter voting logic with multiple transmitters such that the most accurate transmitter and its pressure reading is used to open/not open a valve in case of a malfunctioning transmitter. This promotes valve auto open consistency and adds protection from over-reliance on a single malfunctioning pressure transmitter.

FIGS. 1A and 1B illustrate different perspective views of an embodiment. PRV 100 is coupled to pressure transmitters 1, 2, 3. Transmitters 1 and 2 sense pressure supplied via fitting 111. PRV 100 may be fitted to upstream and downstream lines or conduits (not shown) via apertures 112, 113.

FIGS. 1A and 1B are merely layout examples as there are multiple ways to physically install transmitters. Regardless of the exact method to couple transmitters to the PRV, embodiments are configured to measure, for example, valve upstream pressure so logic may decide whether to actuate the PRV based on the pressure readings. Transmitters may provide pressure reading in various forms, such as mA (milli amp) values based on physical pressure readings.

Figure 2B:
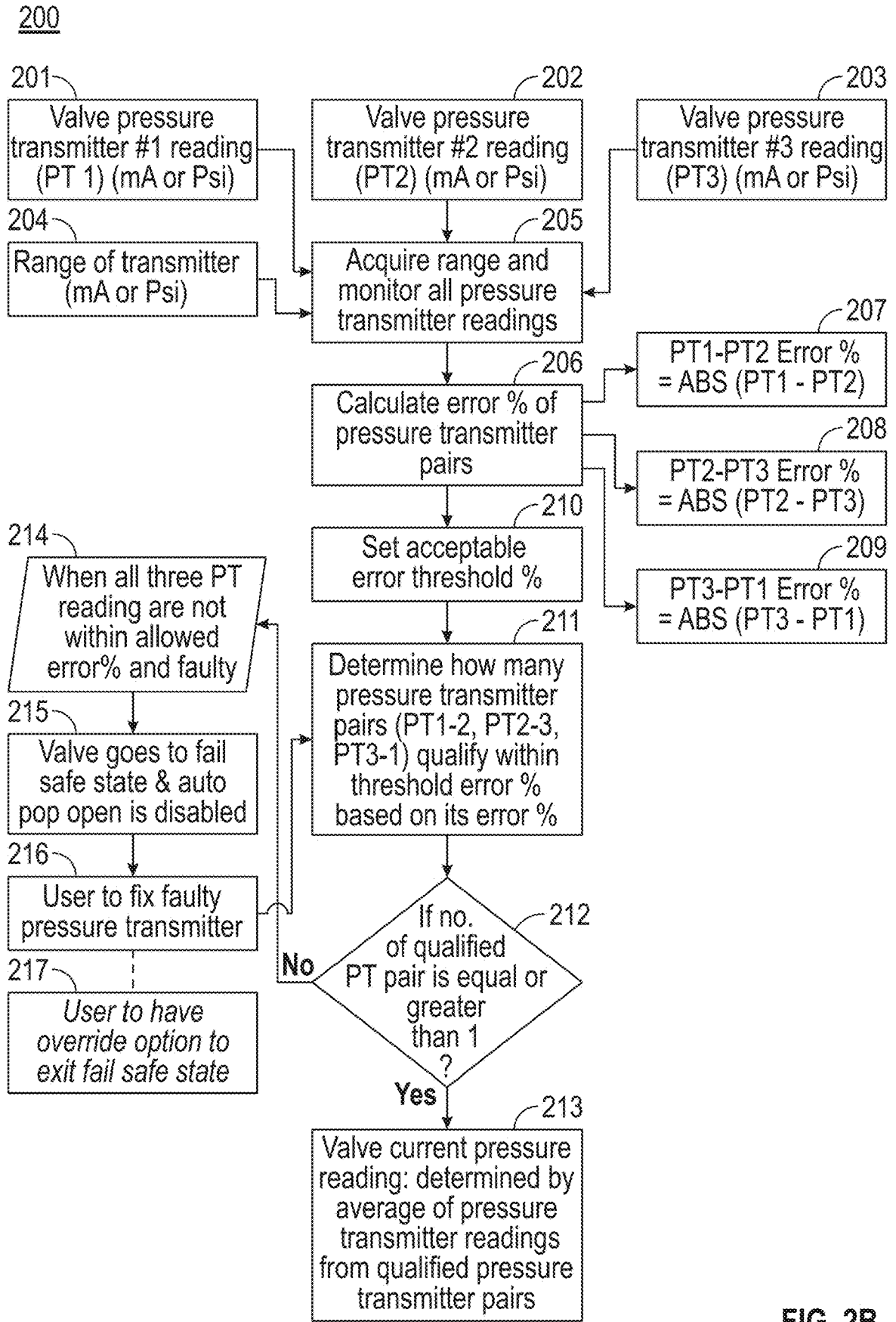

FIGS. 2A and 2B show an embodiment of logic for operating with the system of FIGS. 1A and 1B. Process 200 includes obtaining readings from transmitters 1, 2, 3 respectively via blocks 201, 202, 203. The general range of the transmitters 1, 2, 3 is determined in block 204. While this assumes the same range applies for each transmitter, this may vary in other embodiments that, for example, use different brands or types of transmitters. The information of blocks 201-204 is gathered in block 205 so that error levels may be calculated in block 206 via determinations made in blocks 207, 208, 209. While block 205 says monitor "all" transmitters, this may be all available transmitters or all transmitters within a subset of all available transmitters, etc. For example, in block 207 an absolute value of the difference between the readings from blocks 201, 202 (transmitters 1 and 2) is determined. Block 208 does the same for transmitters 2 and 3 and block 209 does the same for transmitters 1 and 3. Block 210 determines (e.g., via user input or factory setting) an acceptable level of error and then in block 211 the values from blocks 207-209 are compared to the threshold value of block 210. In block 212, if the number ("No") of transmitters that satisfy the threshold error value is 1 or greater, then in block 213 and representative pressure value may be determined, with which to determine whether to open the PRV. In other embodiments, the number of transmitters that must satisfy the threshold error value may be 2 or more, 3 or more, etc. For example, in block 213 an average of "acceptable" readings is determined as the value upon which valve actuation occurs.

Of note, an arrow in, for example, FIG. 2B between blocks 206-207 may indicate a one-way flow of information or content but should not be read so literally. For example, the error percentage determined in block 207 will be communicated (e.g., via push or pull content transfer) to block 206 despite the lack of any arrow pointing to block 206.

Block 210, for example, includes "set" a threshold. This may require a user input via or user interface or, more broadly, including locating data in a memory cache and the like. For instance, loading a value into a memory location may include "setting" a threshold.

Returning to block 212, block 214 addresses the condition where there are no qualified transmitters in block 212. As a result, in block 215 the valve operates in a fail-safe mode (e.g., such a mode may disable automatic opening of the PRV). In block 216, an error message may be determined to alert personnel to serve one or more of the transmitters. Block 217 allows a user to override the fail-safe mode.

Logic similar to that of FIG. 2B is found in FIG. 2A (which provides illustrated examples). However, differences in logic do exist between FIGS. 2A and 2B. For example, in FIG. 2A the representative pressure value is found based on a minimum differential between readings (as well as an alternative method that uses an average value as is the case in FIG. 2B).

Block 204 is optional in some embodiments for process 200. A range value is used in method 200. When block 204 is optional, block 205 may not acquire range values.

FIGS. 3A and 3B show an embodiment of logic for operating with the system of FIGS. 1A and 1B. Process 300 includes obtaining readings from transmitters 1, 2, 3 respectively via blocks 301, 302, 303. The general range of the transmitters 1, 2, 3 is determined in block 304. While this assumes the same range applies for each transmitter, this may vary in other embodiments that, for example, use different brands or types of transmitters.

The measuring range for each transmitter is determined according to its cell type. The range is determined based on the application with attention to turndown ratios and the like. For example, the range may be between 4 and 20 mA based on expected pressures.

The information of blocks 301-304 is gathered in block 305 so that, for example, a representative value from the data set of values collected from each transmitter is determined. For example, in block 306 a middle value from a range of readings from transmitters 1, 2, 3 may be selected. The value may be determined by adding the lowest and highest readings from all readings from transmitters 1, 2, 3 (e.g., over a window of time) and dividing by 2 to obtain the "mid value". See also, for example, FIG. 3A. However, other methods may be used to determine a representative value.

Error levels may be calculated in block 307 via determinations made in blocks 308, 309, 310. For example, in block 308 an absolute value of the difference between a reading from block 201 and the mid value from block 306 is determined. That value is divided by the range from block 304. Block 308 does the same for transmitter 2 and block 309 does the same for transmitter 3. Block 311 determines (e.g., via user input or factory setting) an acceptable level of error and then in block 312 the values from blocks 308-310 are compared to the threshold value of block 311. In block 313, if the number ("No") of transmitters that satisfy the threshold error value is 2 or greater, then in block 314 a representative pressure value may be determined, with which to determine whether to open the PRV. For example, in block 314 an average of "acceptable" readings is determined as the value upon which valve actuation occurs.

Returning to block 313, block 315 addresses the condition where there are less than 2 qualified transmitters in block 313. As a result, in block 316 the valve operates in a failsafe mode (e.g., such a mode may disable automatic opening of the PRV). In block 317, an error message may be determined to alert personnel to serve one or more of the transmitters. Block 318 allows a user to override the fail-safe mode.

Logic similar to that of FIG. 3B is found in FIG. 3A (which provides illustrative examples). While Step 1 of FIG. 3A ($2^{nd}$ example for when all three readings are off) shows an error (value should be 10 as the mid value between 5.05, 10, and 15—not 5.08 which is a typographical error from the other example of FIG. 3A), the logic is still clear.

Figure 4:
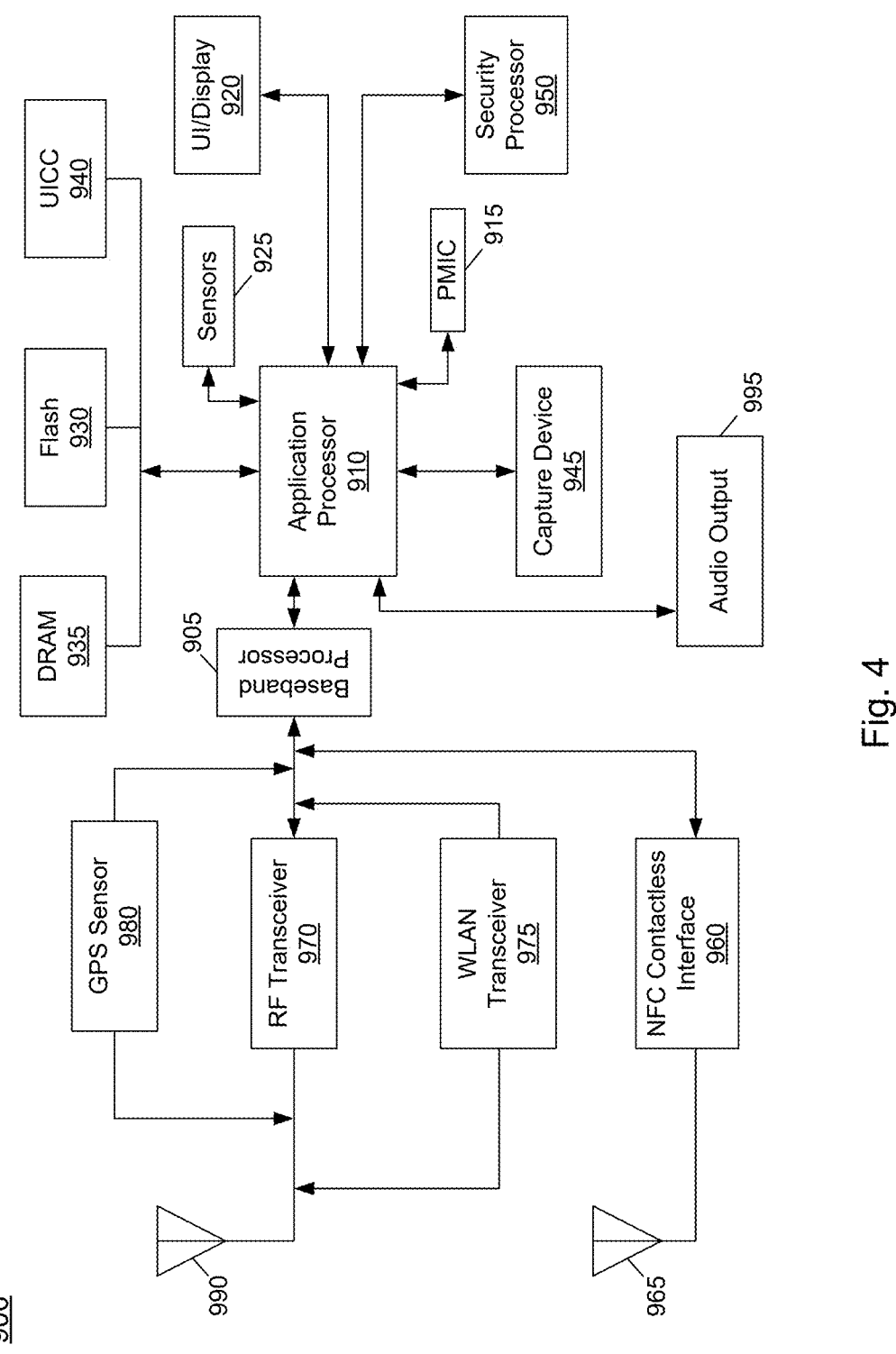
FIGS. 4, 5, 6 depict embodiments for implementing the logic of any of FIGS. 2A, 2B, 3A, and/or 3B.

FIG. 4 includes a block diagram of an example system with which embodiments can be used. As seen, system 900 may be a smartphone or other wireless communicator or any other Internet of Things (IoT) device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920 (e.g., touch screen display). In addition, application processor 910 may couple to a memory system including a non-volatile memory, namely a flash memory 930 and a system memory, namely a DRAM 935. As further seen, application processor 910 also couples to a capture device 945 such as one or more image capture devices that can record video and/or still images.

A universal integrated circuit card (UICC) 940 comprises a subscriber identity module, which in some embodiments includes a secure storage to store secure user information. System 900 may further include a security processor 950 (e.g., Trusted Platform Module (TPM)) that may couple to application processor 910. A plurality of sensors 925, including one or more multi-axis accelerometers may couple to application processor 910 to enable input of a variety of sensed information such as motion and other environmental information. In addition, one or more authentication devices may be used to receive, for example, user biometric input for use in authentication operations.

As further illustrated, a near field communication (NFC) contactless interface 960 is provided that communicates in an NFC near field via an NFC antenna 965. While separate antennae are shown, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more internet of things (IoT) networks, various circuits may be coupled between baseband processor 905 and antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 5G wireless communication protocol such as in accordance with a code division multiple access (CDMA), global system for mobile communication (GSM), long term evolution (LTE) or other protocol. In addition a GPS sensor 980 may be present, with location information being provided to security processor 950. Other wireless communications such as receipt or transmission of radio signals (e.g., AM/FM) and other signals may also be provided. In addition, via WLAN transceiver 975, local wireless communications, such as according to a Bluetooth™ or IEEE 802.11 standard can also be realized.

Figure 5:
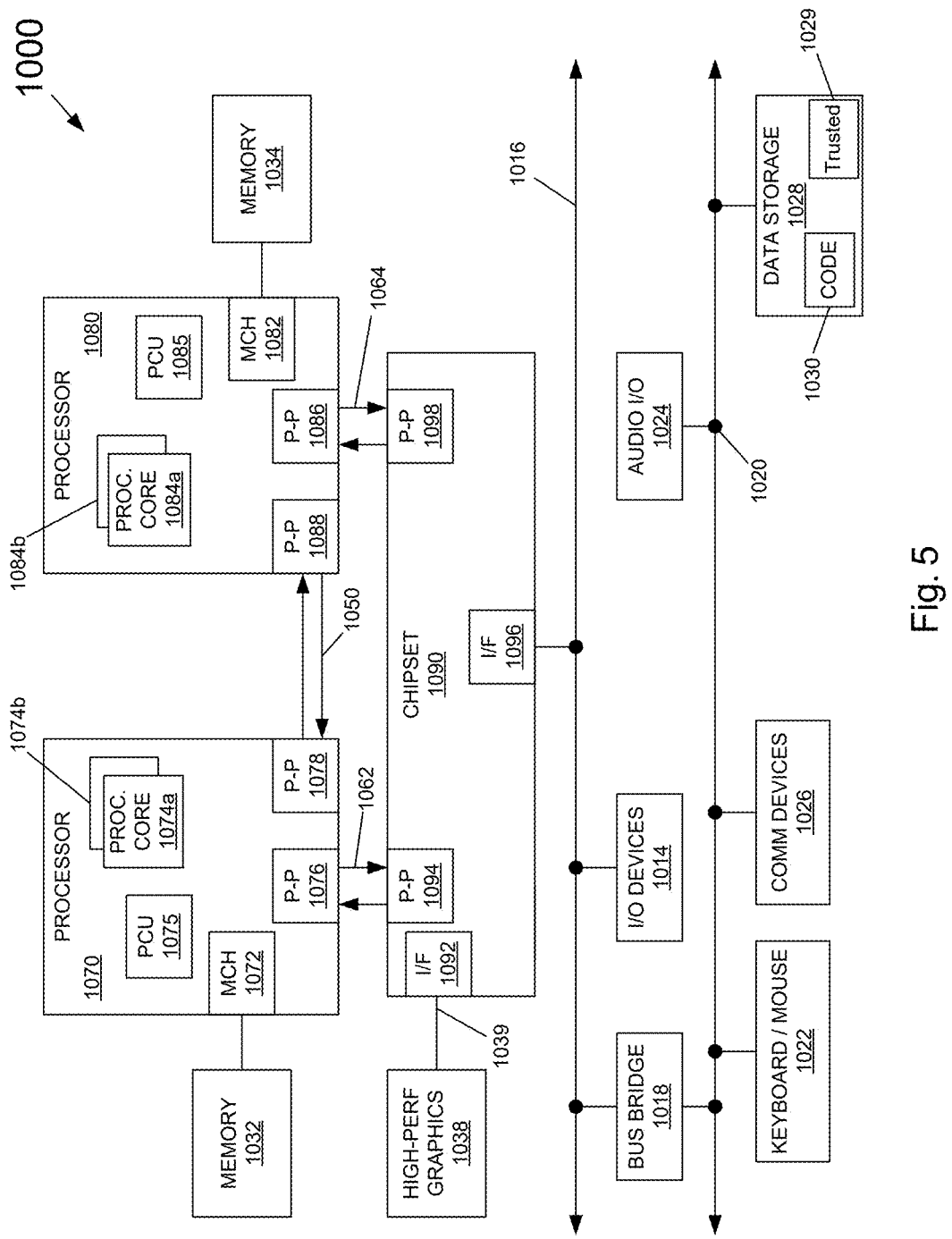

FIG. 5 shows a block diagram of a system in accordance with another embodiment of the present invention. Multiprocessor system 1000 is a point-to-point interconnect system such as a server system, and includes a first processor 1070 and a second processor 1080 coupled via a point-to-point interconnect 1050. Each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include power controller unit 1075 and 1085. In addition, processors 1070 and 1080 each may include a secure engine to perform security operations such as attestations, IoT network onboarding or so forth.

First processor 1070 further includes a memory controller hub (MCH) 1072 and point-to-point (P-P) interfaces 1076 and 1078. Similarly, second processor 1080 includes a MCH 1082 and P-P interfaces 1086 and 1088. MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1062 and 1064, respectively. Chipset 1090 includes P-P interfaces 1094 and 1098.

Furthermore, chipset 1090 includes an interface 1092 to couple chipset 1090 with a high-performance graphics engine 1038, by a P-P interconnect 1039. In turn, chipset 1090 may be coupled to a first bus 1016 via an interface 1096. Various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 6:
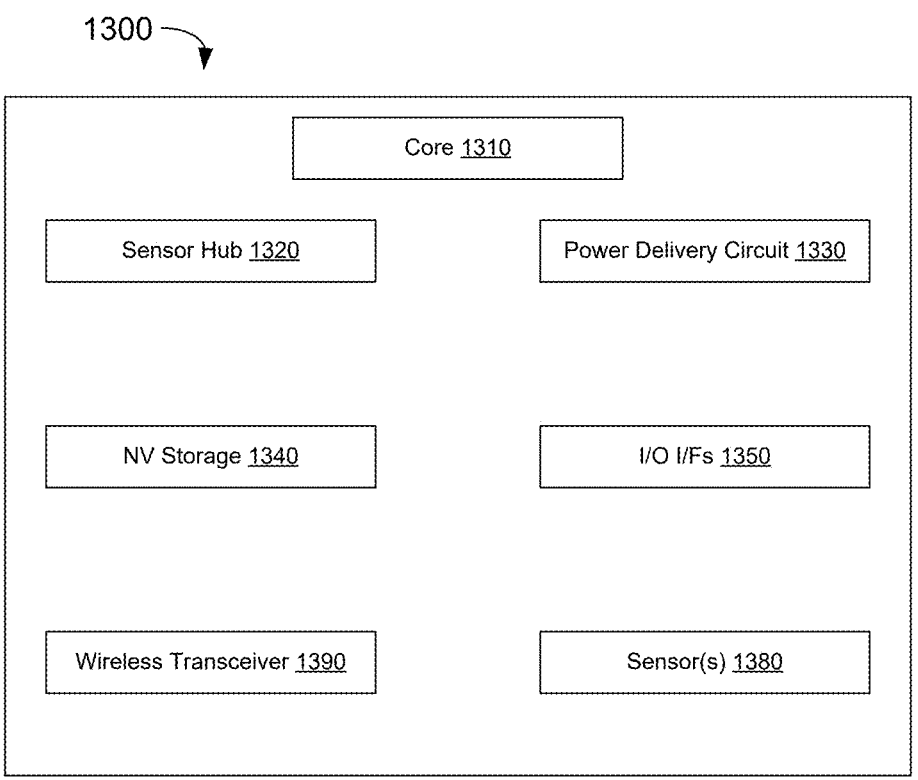

FIG. 6 depicts an IoT environment that may include wearable devices or other small form factor IoT devices. In one particular implementation, wearable module 1300 may be an Intel® Curie™ module that includes multiple components adapted within a single small module that can be implemented as all or part of a wearable device. As seen, module 1300 includes a core 1310 (of course in other embodiments more than one core may be present). Such a core may be a relatively low complexity in-order core, such as based on an Intel Architecture® Quark™ design. In some embodiments, core 1310 may implement a Trusted Execution Environment (TEE). Core 1310 couples to various components including a sensor hub 1320, which may be configured to interact with a plurality of sensors 1380, such as one or more biometric, motion, environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I2C/GPIO protocols, may be present. In addition, a wireless transceiver 1390, which may be a Bluetooth™ low energy or other short-range wireless transceiver is present to enable wireless communications as described herein. In different implementations a wearable module can take many other forms. Wearable and/or IoT devices have, in comparison with a typical general-purpose CPU or a GPU, a small form factor, low power requirements, limited instruction sets, relatively slow computation throughput, or any of the above.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, and the like. Program code may be transmitted in the form of packets, serial data, parallel data, and the like, and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

Various examples now follow. All references to an "example" in the first example set are meant to refer to examples within the first example set and not the second example set (and vice versa), etc.

Example Set 1

Example 1: An oilfield manifold system comprising: a pressure relief valve having an input coupled to an upstream liquid volume and an output coupled to a downstream liquid volume; first, second, and third pressure transmitters coupled to the pressure relief valve; a non-transitory machine-readable medium having stored thereon data, which if used by at least one machine, causes the at least one machine to perform operations comprising: obtaining a first pressure reading from the first pressure transmitter, a second pressure reading from the second pressure transmitter, and a third reading from the third pressure transmitter; determine a first error based on the first and second pressure readings, a second error based on the second and third pressure readings, and a third error based on the first and third pressure readings; determine which, if any, of the first, second, or third errors satisfies a predetermined error threshold; when one or more of the first, second, or third errors satisfies the predetermined error threshold, determine a representative pressure reading and open the pressure relief valve based on the representative pressure reading.

Example 2. The oilfield manifold system of example 1, wherein determining the first error based on the first and second pressure readings includes determining the first error based on a difference between the first and second pressure readings.

Example 3. The oilfield manifold system according to any of examples 1-2, wherein the operations comprise when none of the first, second, or third errors satisfies the predetermined error threshold, operate the pressure relief valve in a fail-safe mode of operation.

Example 4. The oilfield manifold system according to any of examples 1-2, wherein the operations comprise, when none of the first, second, or third errors satisfies the predetermined error threshold, keeping the pressure relief valve closed in response to determining which, if any, of the first, second, or third errors satisfies a predetermined error threshold.

Example 5. The oilfield manifold system according to any of examples 1-4, wherein the first pressure transmitter includes a pressure transducer.

Example 6. The oilfield manifold system according to any of examples 1-5, wherein determining a representative pressure reading includes determining an average of two or more if the first, second, or third pressure readings.

Examples 7-10 are intentionally omitted.

Example 11. An oilfield manifold system comprising: a pressure relief valve having an input coupled to an upstream liquid volume and an output coupled to a downstream liquid volume; first, second, and third pressure transmitters coupled to the pressure relief valve; a non-transitory machine-readable medium having stored thereon data, which if used by at least one machine, causes the at least one machine to perform operations comprising: obtaining a first pressure reading from the first pressure transmitter, a second pressure reading from the second pressure transmitter, and a third reading from the third pressure transmitter; determine a representative value from a range of values, the range of values including the first, second, and third pressure readings; determine a first error based on the first pressure reading and the representative value, a second error based on the second pressure reading and the representative value, and a third error based on the pressure reading and the representative value; determine which, if any, of the first, second, or third errors satisfies a predetermined error threshold; when more than one of the first, second, or third errors satisfies the predetermined error threshold, determine a representative pressure reading and open the pressure relief valve based on the representative pressure reading.

The "representative value from a range of values" may include an average, middle, median, or other such value derived, directly or indirectly, from the range of values. The value may even be pre-determined and come from a favored transmitter (one that has been shown to be most reliable), from a randomly selected transmitter, based on an average of the first and second transmitter measurements which is in turn averaged with the third transmitter measurement. While this explanation and other may be included after Example 11, they are meant to be more global explanations and apply to, for example, the embodiment of Example 1.

Thus, "determine a representative pressure reading and open the pressure relief valve based on the representative pressure reading" constitutes a form of "voting" wherein weaker signals are disfavored (e.g., omitted from valve open/close decisions) and stronger signals are more favored.

A "predetermined error threshold" may be predetermined years, months, or milliseconds before "determin[ing] which, if any, of the first, second, or third errors satisfies a predetermined error threshold".

Other embodiments may forego the threshold determination (see, e.g., blocks 311-313 of FIG. 3B) and instead apply higher weights to measurements deemed less erroneous and lower weights to measurements deemed more erroneous.

As used herein, "based on" (e.g., "determine a first error based on the first pressure reading and the representative value") may include direct or indirect determinations. For example, "based on" may include direct reading of a measurement into or from a memory cache or may instead include a calculated value derived from the measurement.

Example 12. The oilfield manifold system of example 11, the operations comprising: determining a range for the first pressure transmitter; determining the first error based on the range.

Thus, some embodiments may include "determining a range for the first pressure transmitter" but others, such as Example 11, may or may not include "determining a range for the first pressure transmitter". Furthermore, some embodiments may include "determining the first error based on the range" but others may determine the error without necessarily considering the range of any particular transmitter.

Example 13. The oilfield manifold system according to any of examples 11-12, wherein the operations comprise when fewer than one of the first, second, or third errors satisfies the predetermined error threshold, operate the pressure relief valve in a fail-safe mode of operation.

Example 14. The oilfield manifold system according to any of examples 11-12, wherein the operations comprise, when fewer than one of the first, second, or third errors satisfies the predetermined error threshold, keeping the pressure relief valve closed in response to determining which, if any, of the first, second, or third errors satisfies a predetermined error threshold.

Example 15. The oilfield manifold system according to any of examples 11-14, wherein the first pressure transmitter includes a pressure transducer.

Example 16. The oilfield manifold system according to any of examples 11-15, wherein determining a representative pressure reading includes determining an average of two or more if the first, second, or third pressure readings.

Examples 17-20 are intentionally omitted.

Example 21. An embodiment includes only the pressure relief valve and the transmitters according to any of examples 1-7 or 11-16.

Example 22. An embodiment includes only the machine-readable medium according to any of examples 1-7 or 11-16.

Example 23. In an embodiment, the system according to any of examples 1-7 or 11-16 is not necessarily in an oilfield manifold.

Example 24. In an embodiment, the system according to any of examples 1-7 or 11-16 but with the first and second transmitters but not the third pressure transmitter. In other words, two or more pressure transducers are used in some embodiments.

Also, as used herein, a "reading" (or "measurement") may not necessarily require a direct reading (or measurement) of a pressure but may include derivations from direct readings (or measurements). For example, an average of two direct pressure readings (or "measurements") may be called a "reading" (or "measurement") when it is actually derived from two readings (or "measurements") and was never actually sensed by a transducer.

Example Set 2

Example 1. An oilfield manifold system comprising: a pressure relief valve having an input to couple to an upstream fluid volume and an output coupled to a downstream fluid volume; first, second, and third pressure transmitters coupled to the pressure relief valve; at least one non-transitory machine-readable medium having stored thereon data, which if used by at least one machine, causes the at least one machine to perform operations comprising: obtaining a first pressure measurement from the first pressure transmitter, a second pressure measurement from the second pressure transmitter, and a third measurement from the third pressure transmitter; determining a first error based on the first and second pressure measurements, a second error based on the second and third pressure measurements, and a third error based on the first and third pressure measurements; determining which, if any, of the first, second, or third errors satisfies a predetermined error threshold; when one or more of the first, second, or third errors satisfies the predetermined error threshold, determine a representative pressure measurement and open the pressure relief valve based on the representative pressure measurement.

Example 2. The oilfield manifold system of example 1, wherein determining the first error based on the first and second pressure measurements includes determining the first error based on a difference between the first and second pressure measurements.

Example 3. The oilfield manifold system according to any of examples 1-2, wherein the operations comprise when none of the first, second, or third errors satisfies the predetermined error threshold, operate the pressure relief valve in a fail-safe mode of operation.

Example 4. The oilfield manifold system according to any of examples 1-2, wherein the operations comprise, when none of the first, second, or third errors satisfies the predetermined error threshold, keeping the pressure relief valve closed in response to determining which, if any, of the first, second, or third errors satisfies a predetermined error threshold.

Example 5. The oilfield manifold system according to any of examples 1-4, wherein the first pressure transmitter includes a pressure transducer.

Example 6. The oilfield manifold system according to any of examples 1-5, wherein determining a representative pressure measurement includes determining an average of two or more if the first, second, or third pressure measurements.

Example 7. An oilfield manifold system comprising: a pressure relief valve having an input to couple to an upstream fluid volume and an output coupled to a downstream fluid volume; first, second, and third pressure transmitters coupled to the pressure relief valve; at least one non-transitory machine-readable medium having stored thereon data, which if used by at least one machine, causes the at least one machine to perform operations comprising: obtaining a first pressure measurement from the first pressure transmitter, a second pressure measurement from the second pressure transmitter, and a third measurement from the third pressure transmitter; determining a representative value based on a range of values, the range of values including the first, second, and third pressure measurements; determining a first error based on the first pressure measurement and the representative value, a second error based on the second pressure measurement and the representative value, and a third error based on the pressure measurement and the representative value; determining which, if any, of the first, second, or third errors satisfies a predetermined error threshold; when more than one of the first, second, or third errors satisfies the predetermined error threshold, determine a representative pressure measurement and open the pressure relief valve based on the representative pressure measurement.

Example 8. The oilfield manifold system of example 7, the operations comprising: determining a range for the first pressure transmitter; determining the first error based on the range.

Example 9. The oilfield manifold system according to any of examples 7-8, wherein the operations comprise when fewer than one of the first, second, or third errors satisfies the predetermined error threshold, operate the pressure relief valve in a fail-safe mode of operation.

Example 10. The oilfield manifold system according to any of examples 7-8, wherein the operations comprise, when fewer than one of the first, second, or third errors satisfies the predetermined error threshold, keeping the pressure relief valve closed in response to determining which, if any, of the first, second, or third errors satisfies a predetermined error threshold.

Example 11. The oilfield manifold system according to any of examples 7-10, wherein the first pressure transmitter includes a pressure transducer.

Example 12. The oilfield manifold system according to any of examples 7-11, wherein determining a representative pressure measurement includes determining an average of two or more if the first, second, or third pressure measurements.

Example 13. At least one non-transitory machine-readable medium having stored thereon data, which if used by at least one machine, causes the at least one machine to perform operations comprising: obtaining a first pressure measurement from a first pressure transmitter that is coupled to pressure relief valve having an input corresponding to an upstream fluid volume and an output corresponding to a downstream fluid volume; obtaining a second pressure measurement from a second pressure transmitter that is coupled to the pressure relief valve; obtaining a third pressure measurement from a third pressure transmitter that is coupled to the pressure relief valve; determining a first error based on the first and second pressure measurements, a second error based on the second and third pressure measurements, and a third error based on the first and third pressure measurements; determining which, if any, of the first, second, or third errors satisfies a predetermined error threshold; when one or more of the first, second, or third errors satisfies the predetermined error threshold, determine a representative pressure measurement and open the pressure relief valve based on the representative pressure measurement.

Example 14. The at least one medium of example 13, wherein determining the first error based on the first and second pressure measurements includes determining the first error based on a difference between the first and second pressure measurements.

Example 15. The at least one medium according to any of examples 13-14, wherein the operations comprise when none of the first, second, or third errors satisfies the predetermined error threshold, operate the pressure relief valve in a fail-safe mode of operation.

Example 16. The at least one medium according to any of examples 13-14, wherein the operations comprise, when none of the first, second, or third errors satisfies the predetermined error threshold, keeping the pressure relief valve closed in response to determining which, if any, of the first, second, or third errors satisfies a predetermined error threshold.

Example 17. The at least one medium according to any of examples 13-16, wherein the first pressure transmitter includes a pressure transducer.

Example 18. The at least one medium according to any of examples 13-17, wherein determining a representative pressure measurement includes determining an average of two or more if the first, second, or third pressure measurements.

Example 19. At least one non-transitory machine-readable medium having stored thereon data, which if used by at least one machine, causes the at least one machine to perform operations comprising: obtaining a first pressure measurement from a first pressure transmitter that is coupled to pressure relief valve having an input corresponding to an upstream fluid volume and an output corresponding to a downstream fluid volume; obtaining a second pressure measurement from a second pressure transmitter that is coupled to the pressure relief valve; obtaining a third pressure measurement from a third pressure transmitter that is coupled to the pressure relief valve; determining a representative value based on a range of values, the range of values including the first, second, and third pressure measurements; determining a first error based on the first pressure measurement and the representative value, a second error based on the second pressure measurement and the representative value, and a third error based on the pressure measurement and the representative value; determining which, if any, of the first, second, or third errors satisfies a predetermined error threshold; when more than one of the first, second, or third errors satisfies the predetermined error threshold, determine a representative pressure measurement and open the pressure relief valve based on the representative pressure measurement.

Example 20. The at least one medium of example 19, the operations comprising: determining a range for the first pressure transmitter; determining the first error based on the range.

Example 21. The at least one medium according to any of examples 19-20, wherein the operations comprise when fewer than one of the first, second, or third errors satisfies the predetermined error threshold, operate the pressure relief valve in a fail-safe mode of operation.

Example 22. The at least one medium according to any of examples 19-20, wherein the operations comprise, when fewer than one of the first, second, or third errors satisfies the predetermined error threshold, keeping the pressure relief valve closed in response to determining which, if any, of the first, second, or third errors satisfies a predetermined error threshold.

Example 23. The at least one medium according to any of examples 19-22, wherein the first pressure transmitter includes a pressure transducer.

Example 24. The at least one medium according to any of examples 19-23, wherein determining a representative pressure measurement includes determining an average of two or more if the first, second, or third pressure measurements.

As used herein, a "fluid" includes a liquid, a gas, or a combination thereof.

Example Set 3

Examples 1-18 are intentionally omitted.

Example 19. At least one non-transitory machine-readable medium having stored thereon data, which if used by at least one machine, causes the at least one machine to perform operations comprising: obtaining a first pressure measurement from a first pressure transmitter that is coupled to pressure relief valve having an input corresponding to an upstream fluid volume and an output corresponding to a downstream fluid volume; obtaining a second pressure measurement from a second pressure transmitter that is coupled to the pressure relief valve; obtaining a third pressure measurement from a third pressure transmitter that is coupled to the pressure relief valve; determining a representative value based on a range of values, the range of values including the first, second, and third pressure measurements; determining a first error based on the first pressure measurement and the representative value, a second error based on the second pressure measurement and the representative value, and a third error based on the pressure measurement and the representative value; determining which, if any, of the first, second, or third errors satisfies a predetermined error threshold; when more than one of the first, second, or third errors satisfies the predetermined error threshold, determine a representative pressure measurement and open the pressure relief valve based on the representative pressure measurement.

Example 20. The at least one non-transitory medium of example 19, the operations comprising: determining a range for the first pressure transmitter; determining the first error based on the range.

Example 21. The at least one non-transitory medium of example 19, wherein the operations comprise when fewer than one of the first, second, or third errors satisfies the predetermined error threshold, operate the pressure relief valve in a fail-safe mode of operation.

Example 22. The at least one non-transitory medium of example 19, wherein the operations comprise, when fewer than one of the first, second, or third errors satisfies the predetermined error threshold, keeping the pressure relief valve closed in response to determining which, if any, of the first, second, or third errors satisfies a predetermined error threshold.

Example 23. The at least one non-transitory medium of example 19, wherein the first pressure transmitter includes a pressure transducer.

Example 24. The at least one non-transitory medium of example 19, wherein determining a representative pressure measurement includes determining an average of two or more if the first, second, or third pressure measurements.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a side of a substrate is the "top" surface of that substrate; the substrate may actually be in any orientation so that a "top" side of a substrate may be lower than the "bottom" side in a standard terrestrial frame of reference and still fall within the meaning of the term "top." The term "on" as used herein (including in the claims) does not indicate that a first layer "on" a second layer is directly on and in immediate contact with the second layer unless such is specifically stated; there may be a third layer or other structure between the first layer and the second layer on the first layer. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. An oilfield manifold system comprising:

a pressure relief valve having an input coupled to an upstream fluid volume and an output coupled to a downstream fluid volume;

first, second, and third pressure transmitters;

a first conduit that couples both of the first and second pressure transmitters to the pressure relief valve, wherein the first conduit is pressurized at a first conduit pressure;

a second conduit that couples the third pressure transmitter to the pressure relief valve;

at least one non-transitory machine-readable medium having stored thereon data, which if used by at least one machine, causes the at least one machine to perform operations comprising:

obtaining a first pressure measurement based on the first conduit pressure from the first pressure transmitter, a second pressure measurement based on the first conduit pressure from the second pressure transmitter, and a third pressure measurement from the third pressure transmitter;

determining a first error based on the first and second pressure measurements, a second error based on the second and third pressure measurements, and a third error based on the first and third pressure measurements;

determining which, if any, of the first, second, or third errors satisfies a predetermined error threshold;

when one or more of the first, second, or third errors satisfies the predetermined error threshold, determine a representative pressure measurement;

wherein at least two of the first, second, and third pressure measurements are unequal to each other.

2. The oilfield manifold system of claim 1, wherein determining the first error based on the first and second pressure measurements includes determining the first error based on a difference between the first and second pressure measurements.

3. The oilfield manifold system of claim 1, wherein the operations comprise when none of the first, second, or third errors satisfies the predetermined error threshold, operate the pressure relief valve in a fail-safe mode of operation.

4. The oilfield manifold system of claim 1, wherein the operations comprise, when none of the first, second, or third errors satisfies the predetermined error threshold, keeping the pressure relief valve closed in response to determining which, if any, of the first, second, or third errors satisfies a predetermined error threshold.

5. The oilfield manifold system of claim 1, wherein the first pressure transmitter includes a pressure transducer.

6. The oilfield manifold system claim 1, wherein determining a representative pressure measurement includes determining an average of two or more of the first, second, or third pressure measurements.

7. The oilfield manifold system of claim 1, wherein the pressure relief valve is closed.

8. The oilfield manifold system of claim 7, wherein:

the second conduit is pressurized at a second conduit pressure;

the third pressure measurement is based on the second conduit pressure.

9. The oilfield manifold system of claim 8, wherein:

at least a portion of the first conduit is external to the pressure relief valve;

at least a portion of the second conduit is external to the pressure relief valve.

10. An oilfield manifold system comprising:

a pressure relief valve having an input coupled to an upstream fluid volume and an output coupled to a downstream fluid volume;

first, second, and third pressure transmitters;

a first conduit that couples the first pressure transmitter to the pressure relief valve, wherein the first conduit is pressurized at a first conduit pressure;

a second conduit that couples the second pressure transmitter to the pressure relief valve, wherein the second conduit is pressurized at a second conduit pressure;

a third conduit that couples the third pressure transmitter to the pressure relief valve, wherein the third conduit is pressurized at a third conduit pressure;

at least one non-transitory machine-readable medium having stored thereon data, which if used by at least one machine, causes the at least one machine to perform operations comprising:

obtaining a first pressure measurement based on the first conduit pressure from the first pressure transmitter, a second pressure measurement based on the second conduit pressure from the second pressure transmitter, and a third pressure measurement based on the third conduit pressure from the third pressure transmitter;

determining a first error based on the first and second pressure measurements, a second error based on the second and third pressure measurements, and a third error based on the first and third pressure measurements;

determining which, if any, of the first, second, or third errors satisfies a predetermined error threshold;

when one or more of the first, second, or third errors satisfies the predetermined error threshold, determine a representative pressure measurement;

wherein at least two of the first, second, and third pressure measurements are unequal to each other.

11. The oilfield manifold system of claim 10, wherein the pressure relief valve is closed.

12. The oilfield manifold system of claim 11, wherein:

at least a portion of the first conduit is external to the pressure relief valve;

at least a portion of the second conduit is external to the pressure relief valve;

at least a portion of the third conduit is external to the pressure relief valve.

13. The oilfield manifold system of claim 11, wherein determining the first error based on the first and second pressure measurements includes determining the first error based on a difference between the first and second pressure measurements.

14. The oilfield manifold system of claim 13, wherein the first pressure transmitter includes a pressure transducer.

15. The oilfield manifold system claim 11, wherein determining a representative pressure measurement includes determining an average of two or more of the first, second, or third pressure measurements.

* * * * *